United States Patent
Moosmann et al.

(10) Patent No.: US 9,138,780 B2
(45) Date of Patent: Sep. 22, 2015

(54) DEVICE AND METHOD FOR SEPARATING FEEDSTOCK INTO AT LEAST ONE LIGHT MATERIAL FRACTION AND A HEAVY MATERIAL FRACTION

(75) Inventors: Jürgen Moosmann, Kreuzlingen (CH); Bruno Fässler, Appenzell (CH)

(73) Assignee: Bühler AG, Uzwil (CH)

( * ) Notice: Subject to any disclaimer, the term of this patent is extended or adjusted under 35 U.S.C. 154(b) by 0 days.

(21) Appl. No.: 14/115,025

(22) PCT Filed: May 2, 2012

(86) PCT No.: PCT/EP2012/058004
§ 371 (c)(1),
(2), (4) Date: Dec. 10, 2013

(87) PCT Pub. No.: WO2012/150250
PCT Pub. Date: Nov. 8, 2012

(65) Prior Publication Data
US 2014/0353220 A1     Dec. 4, 2014

(30) Foreign Application Priority Data

May 3, 2011    (EP) .................................... 11164671

(51) Int. Cl.
  *B07B 7/086*  (2006.01)
  *B01D 45/12*  (2006.01)
  *B07B 4/02*   (2006.01)
  (Continued)

(52) U.S. Cl.
  CPC ................ *B07B 7/086* (2013.01); *B01D 45/12* (2013.01); *B07B 4/02* (2013.01); *B07B 7/08* (2013.01); *B07B 7/10* (2013.01)

(58) Field of Classification Search
  CPC .............. B04C 5/14; B04C 1/00; B04C 7/00; B07B 4/04; B07B 4/025; B07B 4/02; B07B 7/08; B07B 7/083; B07B 7/086; B07B 7/06; B07B 7/02; B07B 7/0865; B07B 11/04; B07B 9/02; B07B 7/01; A24B 5/10; G01N 1/2208
  USPC ............ 209/137, 139.1, 139.2, 142, 143, 722
  See application file for complete search history.

(56) References Cited

U.S. PATENT DOCUMENTS

| 4,465,194 A | 8/1984 | Coleman |
| 4,721,561 A * | 1/1988 | Oetiker et al. .............. 209/139.1 |
| 5,409,118 A | 4/1995 | Bielagus et al. |

(Continued)

FOREIGN PATENT DOCUMENTS

| DE | 2535881 | 2/1977 |
| DE | 3229747 A1 * | 2/1984 |

(Continued)

*Primary Examiner* — David H Bollinger
(74) *Attorney, Agent, or Firm* — Davis & Bujold, P.L.L.C.; Michael J. Bujold

(57) ABSTRACT

A fractionating device comprises at least one inlet for feedstock, at least one light material outlet for a light material fraction and at least one heavy material outlet for a heavy material fraction. A flow generator for generating gas flow in the fractionating device for separating the light and heavy fractions. A curved centrifugal separating device separates the light material fraction from the gas flow. A conveyor downstream of the inlet carries the feedstock into the centrifugal separating device. At least 50% of the gas can be conducted in the fractionating device as a circulatory flow which is conducted around the conveying device.

15 Claims, 3 Drawing Sheets

(51) Int. Cl.
B07B 7/08 (2006.01)
B07B 7/10 (2006.01)

(56) References Cited

U.S. PATENT DOCUMENTS 5,641,339 A * 6/1997 Johnson .......................... 95/268
6,110,242 A * 8/2000 Young ............................. 55/337

FOREIGN PATENT DOCUMENTS

| | | |
|---|---|---|
| DE | 4112556 | 6/1992 |
| EP | 0178316 | 4/1986 |
| EP | 0668108 | 8/1995 |
| EP | 1263276 | 2/2002 |
| GB | 2067925 | 8/1981 |
| WO | 02/02247 | 1/2002 |

* cited by examiner

DEVICE AND METHOD FOR SEPARATING FEEDSTOCK INTO AT LEAST ONE LIGHT MATERIAL FRACTION AND A HEAVY MATERIAL FRACTION

The present invention relates to the field of separating feedstock into at least one light material fraction and a heavy material fraction, having the features in the preambles of the independent claims.

EP 1 263 276 B1 discloses a smooth-flow suction separating device which is configured with a curved centrifugal separating device, a fraction outlet, a transverse flow rotor and a housing having a pneumatic pipe. This allows feedstock to be fractionated.

However this device has the disadvantage that the feeding of the feedstock into the device is not sufficiently controllable along the axial length of the device. In addition, the footprint of the device is enlarged by the lateral feed of the feedstock.

It is therefore an object of the present invention to avoid the disadvantages of the prior art, and thus in particular to provide a device and a method by way of which feedstock is separable into at least one light material fraction and at least one heavy material fraction, wherein the fractionating device allows the feed of the feedstock into a separating device of the fractionating device to be controlled reliably and in addition a compact structure of the fractionating device is achieved. A further object of the present invention is the provision of a device and a method by way of which feedstock can be separated in an energy-efficient manner in a fractionating device.

These objects are achieved by a device and a method according to the independent claims.

The fractionating device according to the invention for separating feedstock into at least one light material fraction and at least one heavy material fraction comprises at least one inlet for the feedstock, at least one light material outlet for the light material fraction, and at least one heavy material outlet for the heavy material fraction. In addition, the fractionating device comprises a flow generator for generating a gas flow in the fractionating device for separating the feedstock into the light material fraction and the heavy material fraction. In particular, an air flow is generated by the flow generator. The fractionating device furthermore comprises a curved centrifugal separating device for separating at least the light material fraction from the gas flow. A conveying device for conveying the feedstock into the centrifugal separating device is arranged downstream of the inlet in the conveying direction of the feedstock. At least 50% of the gas is conductible as a circulatory flow in the fractionating device. In particular 55% to 95%, preferably 65% to 90% and particularly preferably 75% to 85% of the gas is conductible as a circulatory flow. The circulatory flow is conducted around the conveying device.

The term "feedstock" is understood in the context of the present application to mean bulk material, i.e. a granular or lumpy material which is present in a pourable form and in particular is free-flowing and/or conveyable for example by means of screw conveyors.

In the context of the present application, separation of feedstock into at least one light material fraction and at least one heavy material fraction is understood to mean a relative separation according to the specific weight and/or the particle sizes of the feedstock. In this case, the light material fraction is for example that fraction which is separable from the feedstock by means of an air flow in a centrifugal separating device or in a zig-zag separator known from the prior art. The heavy material fraction is in this example that fraction which is not conveyable by means of the air flow and is conducted into a heavy material outlet for example by means of the effect of gravity.

A "flow generator" is understood in the context of the present application to mean a device for generating a gas flow and in particular an air flow, for example a fan, blower or else a turbine.

A "curved centrifugal separating device" is understood in the context of the present application to mean a curved line suitable for conducting a gas flow, in the case of which centrifugal forces are exerted on particles carried along in the flow, i.e. a light material fraction, by way of the curvature, in order to separate the particles from the gas flow. Such devices are known for example from EP 1 263 276 B1, from EP 0 178 316 B1 and from EP 0 668 108 B1.

A "conveying device" is understood in the context of the present application to mean a device suitable for conveying feedstock. For example, oscillating conveyors, pneumatic conveyors, chain conveyors, conveyor belts or screw conveyors, and any desired combinations thereof, are suitable for this purpose.

Oscillating conveyors are frequently also known as vibrating conveyors and are known from the prior art. Such oscillating conveyors may be in the form for example of vibrating troughs.

A "circulatory flow around the conveying device" is understood in the context of the present application to mean that the gas flow generated by the flow generator is conducted in cross section through the centrifugal separating device around the conveying device arranged in the fractionating device. The conveying device is thus arranged at least sectionally substantially along and/or substantially parallel to a longitudinal axis of the fractionating device within at least one partially closed gas flow of the circulatory flow; in particular, the longitudinal axis of the fractionating device is arranged in an angular range of 45° to 135° to the central circulatory flow, preferably of 80° to 100°, and particularly preferably in a manner substantially perpendicular to the central circulatory flow; in the context of the application, a perpendicular arrangement of the longitudinal axis to the central circulatory flow means an angle of 90°.

The fractionating device according to the invention thus has the advantage that, by means of the conveying device, the feedstock can be conveyed into the centrifugal separating device in a controlled manner in order to achieve separation that is as efficient and reliable as possible. This can be achieved for example in that the feedstock is distributed as uniformly as possible in the fractionating device by means of the conveying device such that the same quantity of feedstock is introduced substantially throughout the gas flow, and so the separation into a light material fraction and a heavy material fraction can take place under substantially identical conditions throughout and thus the reliability and quality of the separation is increased.

A further advantage of the fractionating device according to the invention is the more compact structure of the fractionating device compared with the prior art, this being achieved by the conduction of the circulatory flow around the conveying device. As a result, given the same size of the fractionating device, a higher throughput of feedstock through the fractionating device compared with the prior art is thus possible.

A further advantage is also the return of at least 50% of the gas as a circulatory flow, with the result that the operation of the fractionating device is more energy efficient since as a result less gas is supplied and has to be accelerated.

Preferably, the conveying device is in the form of an oscillating conveyor. In particular, the feedstock is conveyable at least substantially perpendicularly to a cross-sectional area through the circulatory flow by means of the conveying device.

The wording "substantially perpendicularly to the cross-sectional area through the circulatory flow" is understood in the context of the present application to mean a section parallel to the average circulatory flow through the fractionating device in the region of the centrifugal separating device. For example, this section is located, in the case of a cylindrical design of the fractionating device, perpendicularly to the longitudinal axis of the cylindrical fractionating device, wherein the circulatory flow is conducted at least sectionally along the cylinder wall in the interior of the cylinder.

The configuration of the conveying device as an oscillating conveyor has the advantage that oscillating conveyors can be operated reliably and the conveying of the feedstock into the centrifugal separating device is controllable for example by the control and/or regulation of the oscillating conveyor.

The feedstock is for example distributed as uniformly as possible by the oscillating conveyor in the fractionating device, with the distributed feedstock being conveyed into the centrifugal separating device by the oscillating conveyor for example through a gap. In addition, at least one air vane may be arranged in the fractionating device as a distribution aid for the feedstock into the centrifugal separating device.

Particularly preferably, the centrifugal separating device is configured in an at least sectionally narrowing and in particular at least sectionally conically tapering manner in the direction of flow in an outlet region for the light material fraction.

This has the advantage that, as a result of the narrowing, the flow is accelerated in order to further improve the separation of the light material fraction from the gas flow in the centrifugal separating device. In addition, improved further conveyability out of the fractionating device is achieved by this configuration of the outlet region, since as a result the light material outlet merely has a smaller area.

Very particularly preferably, the centrifugal separating device has, at least sectionally on the side facing the flow generator, an inner wall having at least one opening for conducting the gas flow to the flow generator.

This has the advantage that the inner wall of the centrifugal separating device, which faces the flow generator, ensures the conduction of the gas flow to the flow generator and at the same time represents a barrier for the light material fraction in the gas flow in the regions of the inner wall without an opening. This essentially ensures that as few particles of the light material fraction as possible are conveyed into the flow generator.

However, it is alternatively possible for the inner wall in the outlet region to be dispensed with, thereby likewise allowing the gas flow to be conducted to the flow generator.

Preferably, the conveying direction of the conveying device is configured in an at least substantially horizontal manner, in particular sectionally along a longitudinal axis of the fractionating device.

The term "horizontal" is understood in the context of the present application to mean a direction substantially perpendicular to the direction of the effect of gravity.

This has the advantage that, due to of the horizontal conveying direction, the feedstock is reliably conveyable while largely excluding for example gravity, thereby achieving better controllability of the distribution of the feedstock in the fractionating device.

Particularly preferably, the centrifugal separating device is configured in a smooth manner on the inside. In particular, the centrifugal separating device does not have a discontinuous wall profile on a product-conducting wall.

The "product-conducting wall" is understood in the context of the present application to mean that wall of the centrifugal separating device along which, when used as intended, the light material fraction is conveyed due to the centrifugal force and is conducted along this product-conducting wall due to the gas flow.

The term "continuous" is understood in the context of the present application to mean the mathematical definition of this term. In other words, the wall profile does not have any discontinuities, for example projecting or set-back steps.

This smooth configuration and in particular also the configuration as a continuous wall have the advantage that fewer product depositions of light material in the fractionating device are possible, this contributing to an improvement in hygiene.

The term "smooth" is understood in the context of the present application to mean an average surface roughness Ra in the range of 0.2 µm to 6.3 µm and in particular of 0.8 µm to 3.2 µm.

The average surface roughness Ra is also designated as mean roughness index.

The surface roughness is measured according to DIN EN ISO 4287, for example using an M2 perthometer from the company Mahr.

Very particularly preferably, feedstock is distributable along the longitudinal axis of the fractionating device by way of the conveying device.

Preferably, the inner wall has a device for conducting the gas flow to the flow generator.

This has the advantage that the gas flow which is conducted circularly to the flow generator from the centrifugal separating device can be controlled in a better manner. This has the further advantage that the number of light material fraction particles that are conveyed into the flow generator is reduced, thereby increasing the reliability and service life of the fractionating device.

Particularly preferably, the device for conducting is in the form of at least one lamella, wherein the lamella projects into the centrifugal separating device.

A "lamella" is understood in the context of the present application to mean a substantially rectangular plane element, i.e. a length is greater than a width and the width is greater than a thickness of the plane element.

The lamella has a length substantially parallel to the longitudinal axis of the fractionating device. The lamella projects into the centrifugal separating device, wherein the lamella projects into the centrifugal separating device to an extent in the range of 1 mm to 20 mm, preferably of 2 mm to 10 mm and particularly preferably of 3 mm to 8 mm.

Very particularly preferably, the lamella forms an angle in the range of 90° to 180°, preferably of 100° to 170° and particularly preferably of 140° to 160° with the inner wall.

In the context of the present application, the angle is determined in the counterclockwise direction starting from the inner wall, wherein an angle of 90° corresponds to a perpendicular to the inner wall on the side facing the centrifugal separating device in cross section with respect to the circulatory flow.

Preferably, the angle of the lamella is adjustable.

This has the advantage that the conduction of the gas in circulation is adjustable in order to improve the efficiency of the circulatory flow and at the same time to minimize the conveying of particles of the light material fraction into the flow generator.

A further aspect of the present invention is directed to a method for separating feedstock into at least one light material fraction and at least one heavy material fraction by means of a fractionating device. This method is carried out in particular with a device as described above. The fractionating device comprises at least one inlet for the feedstock, at least one light material outlet and at least one heavy material outlet. Furthermore, the fractionating device comprises a flow generator, a curved centrifugal separating device and a conveying device. The method comprises the step of conveying the feedstock into at least one inlet of the fractionating device, whereupon the feedstock is subsequently conveyed onto and/or into a conveying device arranged downstream of the inlet. Subsequently, the feedstock is conveyed into the centrifugal separating device by means of the conveying device. Following this, the light material fraction is separated from the heavy material fraction by means of a gas flow generated by the flow generator. Subsequently, the light material fraction is separated from the gas flow in the centrifugal separating device, wherein at least 50% of the gas in the gas flow is conducted as a circulatory flow in the fractionating device. The circulatory flow is conducted around the conveying device.

This method has all of the advantages explained above with respect to the fractionating device.

Preferably, the separation of the light material fraction from the heavy material fraction takes place by means of the gas flow and gravity.

The feedstock is thus conveyed by means of the conveying device into the centrifugal separating device, wherein only the light material fraction is conveyed by the gas flow along the centrifugal separating device. The heavy material fraction is conveyed by gravity to the heavy material outlet for further processing.

This has the advantage that, by adjusting the gas flow, the fractionation can be adjusted according to the requirements. In addition, no further device is necessary for separating the heavy material fraction by means of gravity, with the result that the method can be carried out in a more energy-efficient manner.

Particularly preferably, the feedstock is distributed along the longitudinal axis of the fractionating device by means of the conveying device.

This has the advantage that a distribution which is as uniform as possible along the longitudinal axis of the fractionating device is achievable, with the result that the separation takes place more reliably and more precisely.

Very particularly preferably, the circulatory flow comprises a proportion of gas in the gas flow in the range of 55% to 95%, preferably of 65% to 90% and particularly preferably of 75% to 85%.

This has the advantage that as large a proportion of gas as possible is conducted in the circulatory flow, with the result that the energy consumption and also the air consumption of the fractionating device is lowered.

Further advantages of the device according to the invention and the method according to the invention are explained in more detail for better understanding in the following text with reference to figures and exemplary embodiments, without the invention being limited thereto. In the figures.

Figure 1:
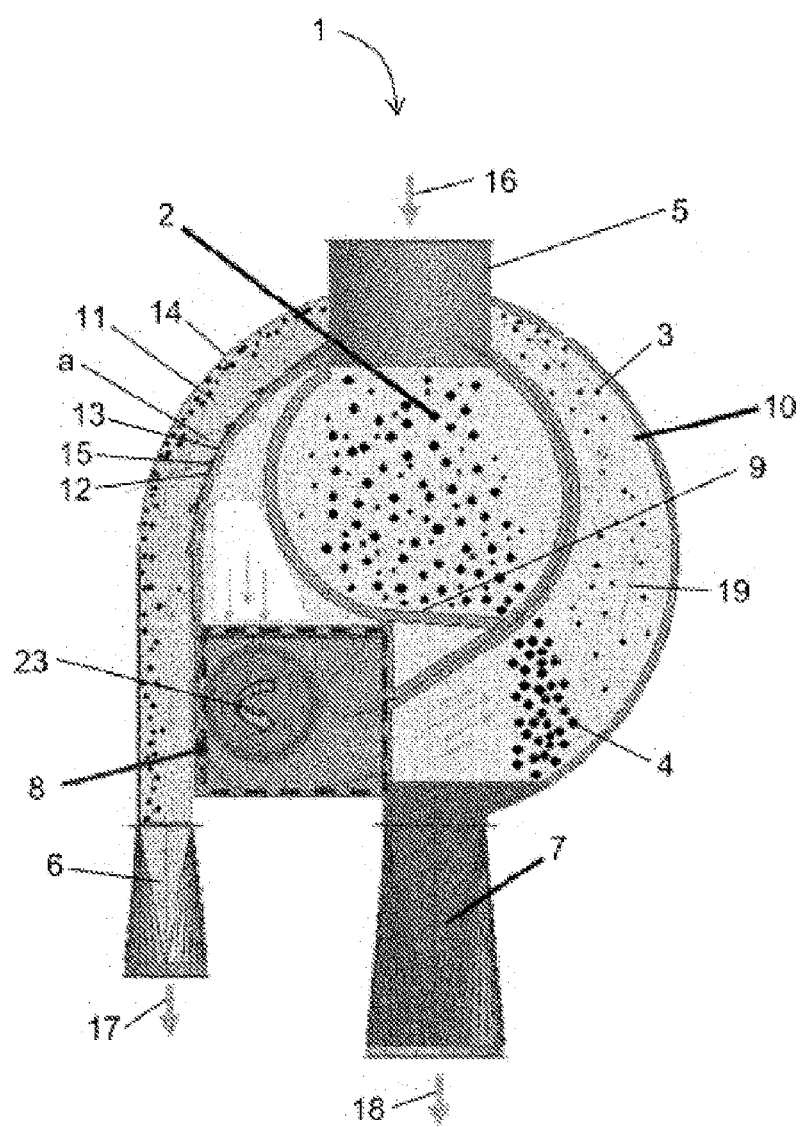
FIG. 1 shows a schematic illustration of a fractionating device according to the invention in section parallel to the circulatory flow through the centrifugal separating device.

FIG. 1 illustrates a schematic illustration of a fractionating device 1 according to the invention in cross section parallel to a circulatory flow through a centrifugal separating device 10 of the fractionating device 1.

The fractionating device 1 has an inlet 5 for feedstock 2 and also a light material outlet 6 for the light material fraction 3 and a heavy material outlet 7 for the heavy material fraction 4. Furthermore, the fractionating device 1 has a flow generator 8, in the form of a fan, for generating an air flow in the fractionating device 1. The fractionating device 1 also has a centrifugal separating device 10 having a curved product-conducting wall 14 for conducting the light material fraction. In an outlet region 11, which is not formed in a conically tapering manner here, an inner wall 12 having a plurality of openings 13 for conducting the air flow to the fan is arranged on the side facing the fan. This inner wall 12 also has a plurality of lamellae 15 for conducting the air into the fan in a better manner.

Feedstock 2 is conveyed during operation along the arrow 16 into the inlet 5 of the fractionating device 1 and drops, downstream of the inlet 5, onto a conveying device 9, in the form of an oscillating conveyor, for conveying the feedstock into the centrifugal separating device. The oscillating conveyor is in the form of what is known as a vibrating trough, which is connected to the centrifugal separating device 10 by means of a gap (not visible), wherein feedstock is conveyable through the gap.

By means of the flow generator 8 in the form of a fan, an air flow is generated in the fractionating device along the arrows designated as 19. In this case, 80% of the air flow is fed back to the fan through the openings 13. Thus, 20% fresh air is drawn in by the fan in each case.

By means of the air flow 19, the light material fraction 3 is now separated from the heavy material fraction 4. This takes place by adjusting the flow rate of the air such that the light material fraction 3 is conveyed counter to the direction of the effect of gravity, which acts substantially parallel to the arrow 16, into a first section of the centrifugal separating device 10. The heavy material fraction 4 is conveyed by gravity into the heavy material outlet 7 and leaves the fractionating device along the arrow 18.

The light material fraction 3 is accelerated in the centrifugal separating device 10 substantially to the speed of the air flow 19 and is conveyed to the product-conducting wall 14 by the centrifugal force. As a result, the light material fraction accumulates substantially on the product-conducting wall 14, with the result that the light material fraction 3 is separated from the air flow.

The light material fraction 3 is thus conveyed along the product-conducting wall 14 to the light material outlet 6 and leaves the fractionating device along the arrow 17. In this case, 20% of the air flow is also conveyed through the light material outlet 6 and out of the fractionating device 1.

By means of the fan, approximately 80% of the air is sucked out of the outlet region 11 and fed back to the centrifugal separating device 10. The lamellae 15, which form an angle α of 150° with the inner wall 12, ensure that the air returned into the fan is substantially free of particles of the light material fraction 3.

In the fan, the returned air and also the fresh air drawn in is accelerated to the speed necessary for separating the feedstock 2 into the light material fraction 3 and the heavy material fraction 4, this being suggested by the arrow 23.

Figure 2:
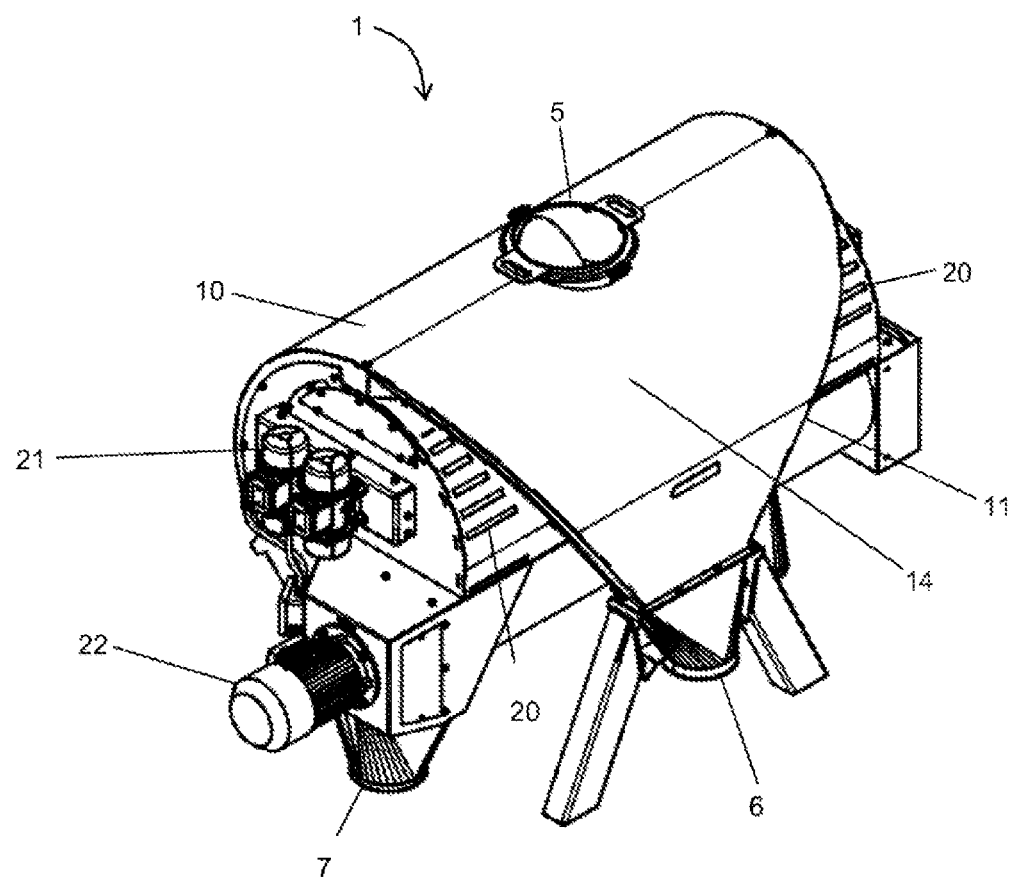
FIG. 2 shows a perspective illustration of a fractionating device according to the invention according to FIG. 1.

FIG. 2 illustrates an alternative fractionating device 1 according to the invention.

From here on and in the following text, identical reference signs designate identical components in the figures.

In contrast to FIG. 1, in this case the outlet region 11 is formed in a conically tapering manner in the direction of flow.

In addition to the illustration according to FIG. 1, ventilation slots 20 are visible here and serve to draw in fresh air.

Furthermore, drives 21 for the conveying device (not visible) and also the drive 22 for the flow generator (not visible) are shown here.

Figure 3:
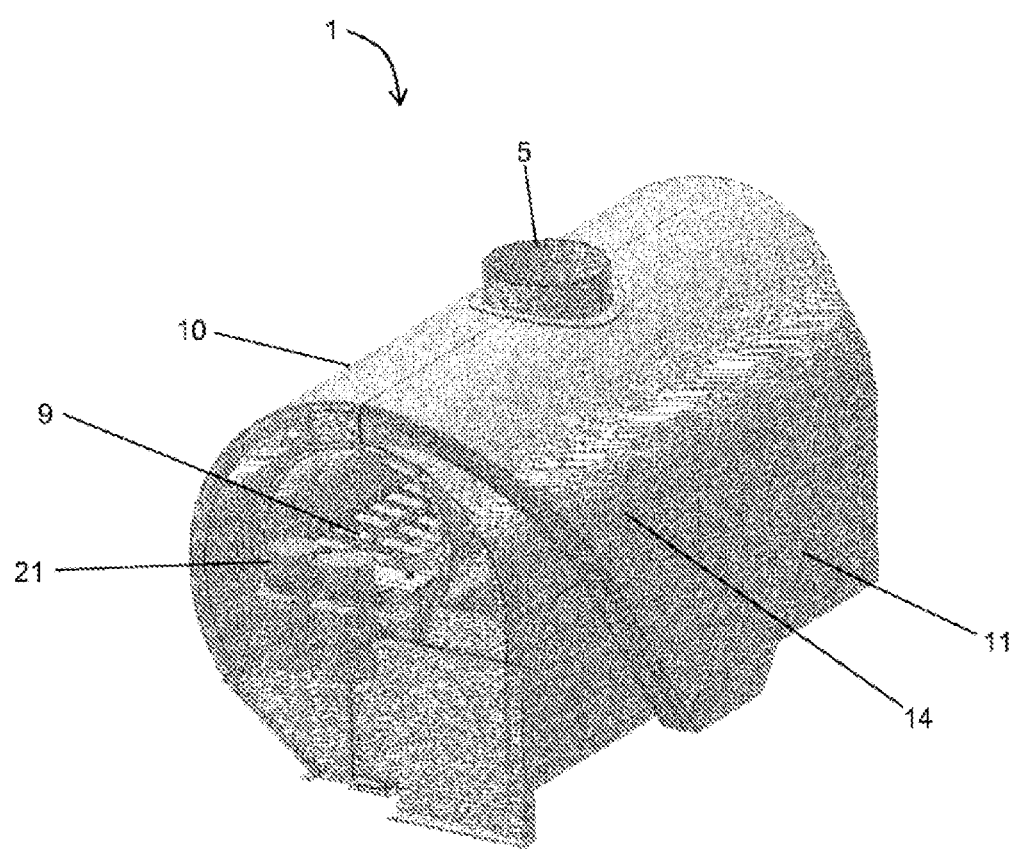
FIG. 3 shows a perspective illustration of the fractionating device according to the invention according to FIG. 1 with a visible conveying device.

FIG. 3 illustrates the fractionating device 1 according to FIG. 2, wherein some elements have been omitted for greater clarity.

The fractionating device 1, which is illustrated in a laterally open manner here, shows the conveying device 9, in the form of an oscillating conveyor, with the associated drives 21. By means of this conveying device 9, feedstock conveyed into the fractionating device 1 through the inlet 5 can now be conveyed along the longitudinal axis of the fractionating device 1 substantially parallel to the oscillating conveyor and perpendicularly to the effect of the direction of gravity respectively, in order to distribute the feedstock along the longitudinal axis of the fractionating device 1.

The invention claimed is:

1. A fractionating device for separating feedstock into at least one light material fraction and a heavy material fraction, comprising at least one inlet for the feedstock, at least one light material outlet for the light material fractions, and at least one heavy material outlet for the heavy material fraction, a flow generator for generating a gas flow in the fractionating device for separating the feedstock into the light material fractions and the heavy material fraction, a curved centrifugal separating device for separating at least the light material fractions from the gas flow, a conveying device, arranged downstream of the inlet in the conveying direction of the feedstock, for conveying the feedstock into the centrifugal separating device, wherein at least 50% of the gas is conductible as a circulatory flow in the fractionating device, and wherein the circulatory flow is conducted around the conveying device.

2. The fractionating device as claimed in claim 1, wherein the conveying device is in the form of an oscillating conveyor.

3. The fractionating device as claimed in claim 1, wherein the centrifugal separating device is configured in an at least sectionally narrowing manner in the direction of flow in an outlet region for the light material fractions.

4. The fractionating device as claimed in claim 1, wherein the centrifugal separating device has in the outlet region, at least sectionally on the side facing the flow generator, an inner wall having at least one opening for conducting the gas flow to the flow generator.

5. The fractionating device as claimed in claim 4, wherein the inner wall has a device for conducting the gas flow to the flow generator.

6. The fractionating device as claimed in claim 5, wherein the device for conducting is in the form of at least one lamella, wherein the lamella projects into the centrifugal separating device.

7. The fractionating device as claimed in claim 6, wherein the lamella forms an angle (a) in the range of 90° to 180° with the inner wall.

8. The fractionating device as claimed in claim 7, wherein the angle (a) is adjustable.

9. The fractionating device as claimed in claim 1, wherein the conveying direction of the conveying device is configured in an at least substantially horizontal manner.

10. The fractionating device as claimed in claim 9, wherein feedstock is distributable along a longitudinal axis of the fractionating device by way of the conveying device.

11. The fractionating device as claimed in claim 1, wherein the centrifugal separating device has an inside surface with an average roughness index of 0.2 µm to 6.3 µm.

12. A method for separating feedstock into at least one light material fraction and a heavy material fraction by means of a fractionating device comprising at least one inlet for the feedstock, at least one light material outlet and at least one heavy material outlet, a flow generator, a curved centrifugal separating device and a conveying device, comprising the following steps of:

conveying the feedstock into the at least one inlet of the fractionating device onto and/or into the conveying device arranged downstream of the inlet, conveying the feedstock into the centrifugal separating device by means of the conveying device, separating the light material fractions from the heavy material fraction by means of the gas flow, generated by the flow generator, in the centrifugal separating device, separating the light material fraction from the gas flow in the centrifugal separating device, and conducting at least 50% of the gas in the gas flow as a circulatory flow in the fractionating device, wherein the circulatory flow is conducted around the conveying device.

13. The method as claimed in claim 12, wherein the separation of the light material fractions from the heavy material fraction takes place by means of the gas flow and gravity.

14. The method as claimed in claim 12, wherein the feedstock is distributed along the longitudinal axis of the fractionating device by means of the conveying device.

15. The method as claimed in claim 12, wherein the circulatory flow comprises a proportion of gas in the gas flow in the range of 55% to 95%.

* * * * *